(12) United States Patent
Adam et al.

(10) Patent No.: US 6,582,563 B1
(45) Date of Patent: Jun. 24, 2003

(54) WATER PURIFICATION SYSTEM

(75) Inventors: Tyler L. Adam, Omaha, NE (US); Robert W. Haney, Lincoln, NE (US)

(73) Assignee: innowave, inc., Omaha, NE (US)

( * ) Notice: Subject to any disclaimer, the term of this patent is extended or adjusted under 35 U.S.C. 154(b) by 0 days.

(21) Appl. No.: 09/670,758

(22) Filed: Sep. 27, 2000

(51) Int. Cl.⁷ .............................. B01D 3/02; B01D 3/10; B01D 3/42; C02F 1/18; F16K 31/18

(52) U.S. Cl. .................... 202/83; 137/391; 137/393; 137/426; 137/581; 202/181; 202/205; 203/11; 203/10; 203/DIG. 18; 203/1

(58) Field of Search ..................... 202/83, 181, 205, 202/200, 193, 196; 203/1, 4, 10, 11, DIG. 17, DIG. 18; 137/426, 441, 262, 563, 423, 391, 395–398, 390, 392, 393, 581, 599.15, 625, 313

(56) References Cited

U.S. PATENT DOCUMENTS

| | | | |
|---|---|---|---|
| 4,080,247 A | * 3/1978 | Malakul | ..................... 202/181 |
| D272,175 S | 1/1984 | Gedye | |
| 4,518,503 A | 5/1985 | Fermaglich | |
| 4,622,102 A | * 11/1986 | Diebel | ........................ 202/202 |
| D295,656 S | 5/1988 | Bond et al. | |
| 4,861,435 A | 8/1989 | Sweet, Jr. | |
| 4,877,489 A | * 10/1989 | Lloyd | ........................... 203/1 |
| 4,888,097 A | 12/1989 | Palmer et al. | |
| 4,906,337 A | 3/1990 | Palmer | |
| 4,943,353 A | * 7/1990 | Shannon | ..................... 203/10 |
| 4,946,558 A | * 8/1990 | Salmon | ....................... 203/10 |
| 4,975,154 A | * 12/1990 | Palmer et al. | ....... 203/DIG. 18 |
| 5,021,128 A | 6/1991 | Palmer | |
| 5,053,111 A | 10/1991 | Ellerbe, Jr. | |
| D323,875 S | 2/1992 | Kang et al. | |
| 5,178,734 A | * 1/1993 | Palmer | ....................... 202/181 |
| 5,281,309 A | * 1/1994 | Greene | ....................... 202/200 |
| 5,286,351 A | 2/1994 | Salmon | |
| 5,290,402 A | * 3/1994 | Tsai | ........................... 137/412 |
| 5,304,286 A | 4/1994 | Palmer | |
| 5,348,623 A | * 9/1994 | Salmon | ............... 203/DIG. 18 |
| 5,368,698 A | * 11/1994 | Field et al. | .................. 202/195 |
| 5,464,531 A | 11/1995 | Greene | |
| 5,587,055 A | 12/1996 | Hartman et al. | |
| 5,662,779 A | 9/1997 | Greene et al. | |
| D412,734 S | 8/1999 | Schroer | |
| 6,099,693 A | * 8/2000 | Palmer et al. | ................. 202/83 |

FOREIGN PATENT DOCUMENTS

| | | |
|---|---|---|
| FR | 2 692 808 A1 | 12/1993 |
| NL | 6809729 | 1/1970 |

OTHER PUBLICATIONS

"Water Distiller Features" *Polar–Clear–Water: How our distillers work*, from website www.members.home.net/polarclear/howitworks.html. July 1999.

* cited by examiner

*Primary Examiner*—Virginia Manoharan
(74) *Attorney, Agent, or Firm*—Merchant & Gould P.C.

(57) ABSTRACT

An improved portable water purification system with reduced leaks and the capability of automatic draining of its boiling tank, as well as to a method of preventing water spillage from a portable water purification system and a method of draining a boiling tank of a portable water purification system. The system includes a control tank that is connected to a water supply, a boiling tank that is connected to the control tank for boiling water, a condenser that is connected to the boiling tank for receiving steam from the boiling tank and for condensing the steam to form distilled water, and a distilled water tank that is connected to the condenser for collecting distilled water from the condenser. An inlet solenoid control valve is disposed between the water supply and the control tank, with the inlet solenoid control valve controlling flow of water to the control tank. The system further includes a UV light sanitizer, leak prevention and leak detection features, and a mechanism for detecting water quality.

13 Claims, 4 Drawing Sheets

WATER PURIFICATION SYSTEM

FIELD

The invention disclosed herein relates to portable water purification systems. More particularly, the invention disclosed herein relates to an improved portable water purification system with reduced leaks and the capability of automatic draining of a boiling tank.

BACKGROUND

One known water treatment method to improve the purity and taste of drinking water is distillation. Distillation involves boiling water to generate steam, and then condensing the steam to form water with a reduced amount of contaminants. The contaminants, which have a vaporization temperature higher than that of water, remain in the boiler, while solvents having a boiling point lower than water may be separated from the steam by venting prior to condensation.

Previous attempts at forming portable distillation systems for use in purifying drinking water are known from U.S. Pat. Nos. 5,281,309 and 5,464,531. The devices in these patents are adapted to be directly mounted onto a water cooler dispensing unit as a replacement for the conventional water bottle. These devices utilize a control mechanism disposed between the feed tank and the boiler to prevent backflow from the boiler to the feed tank and to control the water level within the boiler. In addition, these devices utilize a filter between the condenser coil and the distilled water tank to filter the water before the water enters the distilled water tank. A float switch disposed in the distilled water tank prevents overfilling of the tank. However, in the event of failure of the float switch, the distilled water tank can overflow and lead to water spillage. Further, the location of the filter is less than optimal, since the parts of the system must be designed to allow the filter to be accessible from outside the housing of the distilling unit.

There is, however, a continuing need for improved portable distillation systems that are simpler in design and which prevent water spillage and leaks.

SUMMARY

The invention provides an improved portable water purification system with reduced leaks and the capability of automatic draining of a boiling tank, as well as a method of preventing water spillage from a portable water purification system and a method of draining a boiling tank of a portable water purification system.

One aspect of the invention is a portable water purification system that comprises a control tank that is connected to a water supply, a boiling tank that is connected to the control tank for boiling water, a condenser that is connected to the boiling tank for receiving steam from the boiling tank and for condensing the steam to form distilled water, and a distilled water tank that is connected to the condenser for collecting distilled water from the condenser. An inlet solenoid control valve is disposed between the water supply and the control tank, with the inlet solenoid control valve controlling flow of water to the control tank.

Another aspect of the invention is a portable water purification system that comprises a control tank connected to a water supply, a boiling tank connected to the control tank for boiling water, a condenser connected to the boiling tank for receiving steam from the boiling tank and for condensing the steam to form distilled water, a distilled water tank connected to the condenser for collecting distilled water from the condenser, a drain line connected to the boiling tank, a solenoid operated drain valve controlling flow through the drain line, and a cooling water line extending between the water supply and the drain line.

A further aspect of the invention is a water purification system that comprises a control tank connected to a water supply, a boiling tank connected to the control tank for boiling water, a condenser connected to the boiling tank for receiving steam from the boiling tank and for condensing the steam to form distilled water, a distilled water tank connected to the condenser for collecting distilled water from the condenser, and means for preventing water spillage from the system.

Yet another aspect of the invention is a method of preventing water spillage in a portable water purification system that includes a control tank, a boiling tank, and a distilled water tank. The method comprises providing an inlet solenoid control valve between the control tank and a water supply line, with the inlet control valve capable of controlling the inflow of water to the control tank; providing a switch in at least one of the control tank and the distilled water tank, the switch being activated and providing a signal when the control tank or the distilled water tank is full; and closing the inlet solenoid control valve in response to the signal from the switch, thereby preventing further inflow of water to the control tank.

An additional aspect of the invention is a method of draining a boiling tank of a portable water purification system. The method comprises opening a drain valve to drain water at a first temperature from the boiling tank through a drain line, and mixing inlet water at a second temperature with the water at the first temperature from the boiling tank, wherein the mixing occurs within the drain line and the second temperature is lower than the first temperature.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying description, in which there is described a preferred embodiment of the invention.

DETAILED DESCRIPTION

Figure 1:
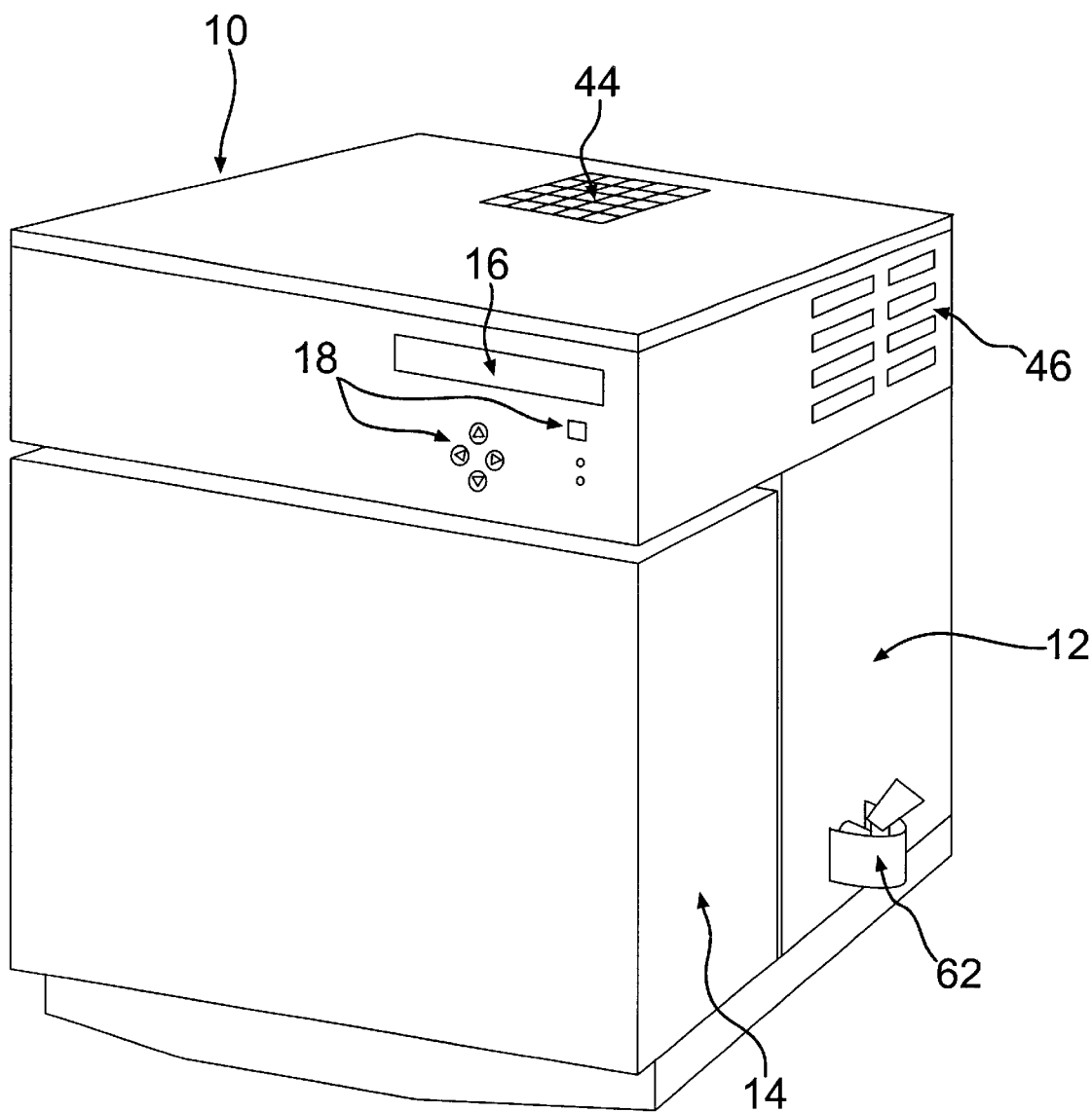
FIG. 1 is a perspective view of a portable water purification system according to the invention.

FIG. 1 illustrates a portable water purification system 10 according to the invention. The system 10 is designed to be portable to enable the system to be transported from one location to another location where water purification is desired. The system 10 is preferably designed to rest upon a generally flat surface, such as a countertop, adjacent a source of water which is to be purified. The system 10 can also rest upon a water cooler dispensing unit as a replacement for the conventional water bottle.

The system 10 includes a housing 12 with a distilled water tank 14 mounted on the housing 12 and disposed at the front thereof. A display panel 16 and a plurality of input buttons 18 are provided on the front of the housing 12 adjacent the top thereof. The input buttons 18 permit control inputs controlling operation of the system 10, with the display panel 16 displaying a variety of system information, such as an operating state of the system 10.

Figure 2:
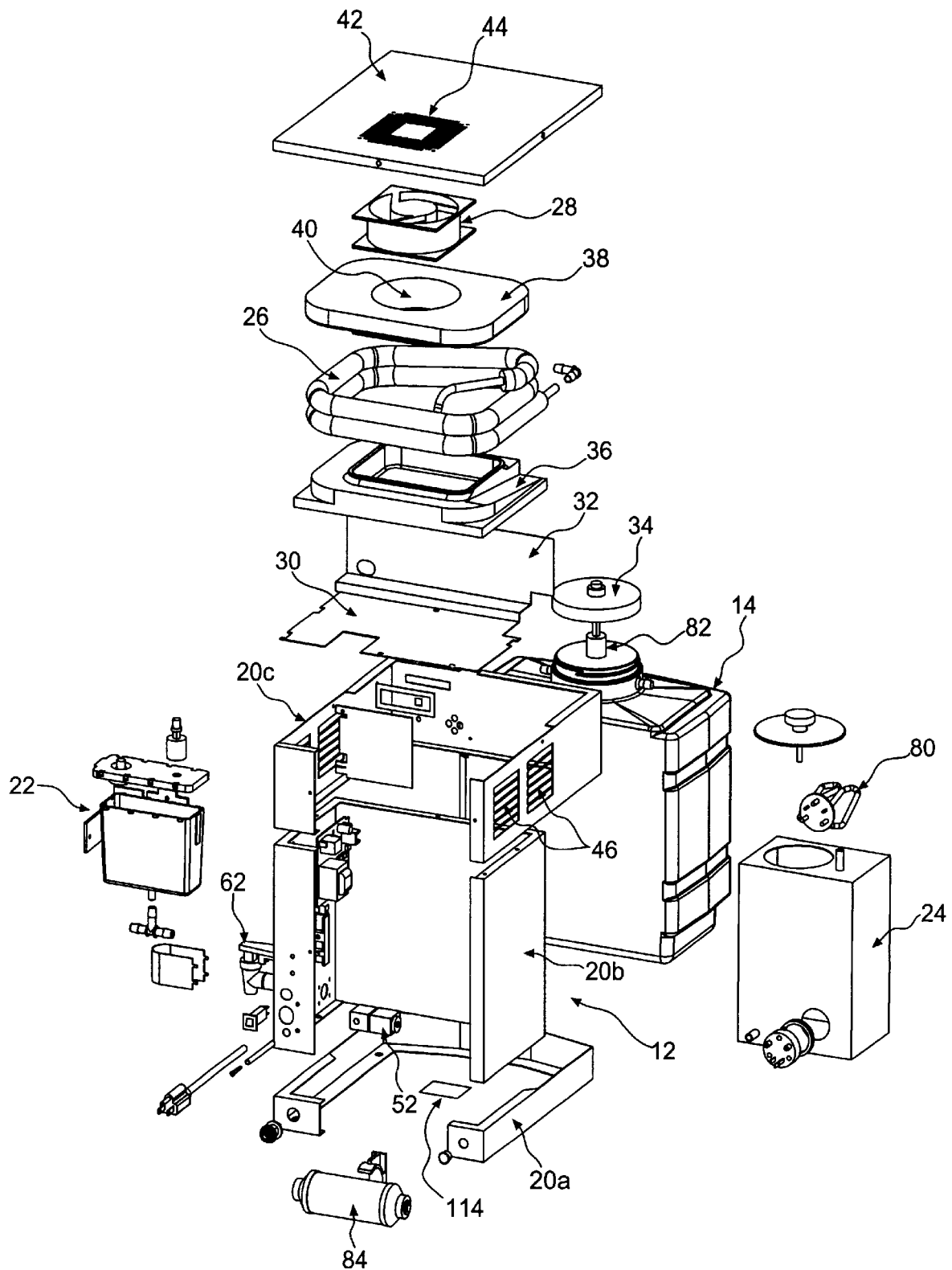
FIG. 2 is an exploded view of the components forming the portable water purification system.

With reference now to FIG. 2, the details of the system 10 will be discussed. The housing 12 is formed from three housing portions 20a, 20b, 20c. The housing portion 20a forms a base upon which the remainder of the system 10 rests, with the housing portion 20a designed to rest upon a suitable support surface, such as a countertop. The housing portion 20b connects to the housing portion 20a and defines the central portion of the housing, and forms an enclosure for a number of the components of the system 10, including a control tank 22, a boiling tank 24, and various pipes, fittings and control circuitry of the system 10. The housing portion 20c connects to the top of the housing portion 20b and defines a separate enclosure for a condenser 26 and cooling fan 28.

As is evident from FIGS. 1 and 2, the housing portion 20b is recessed relative to the housing portions 20a, 20c thereby defining an area in which the water tank 14 fits between the housing portions 20a, 20c. FIG. 2 illustrates a plate 30 that separates the enclosure defined by the housing portion 20b from the enclosure defined by the housing portion 20c. A plate 32 extends upwardly from the plate 30 to divide the enclosure of the housing portion 20c into a rear enclosure containing the condenser 26 and cooling fan 28, and a front enclosure containing a removable lid 34 on the tank 14 that permits access to the interior of the water tank 14 as well containing a circuit board associated with the display panel 16 and input buttons 18.

The condenser 26 itself is held between two insulating pieces 36, 38, and the cooling fan 28 fits within a hole 40 defined in the insulating piece 38 so that the fan 28 is disposed within the circumference of the condenser 26 to provide effective heat dissipation from the condenser 26. A cover 42 connects to the housing portion 20c and closes off the housing 12 and defines the top thereof. The cover 42 includes a grill 44 located above the fan 28 to permit air flow out of the housing portion 20c. In addition, the housing portion 20c is provided with vents 46 to permit air to enter the enclosure defined by the housing portion 20c.

Figure 3:
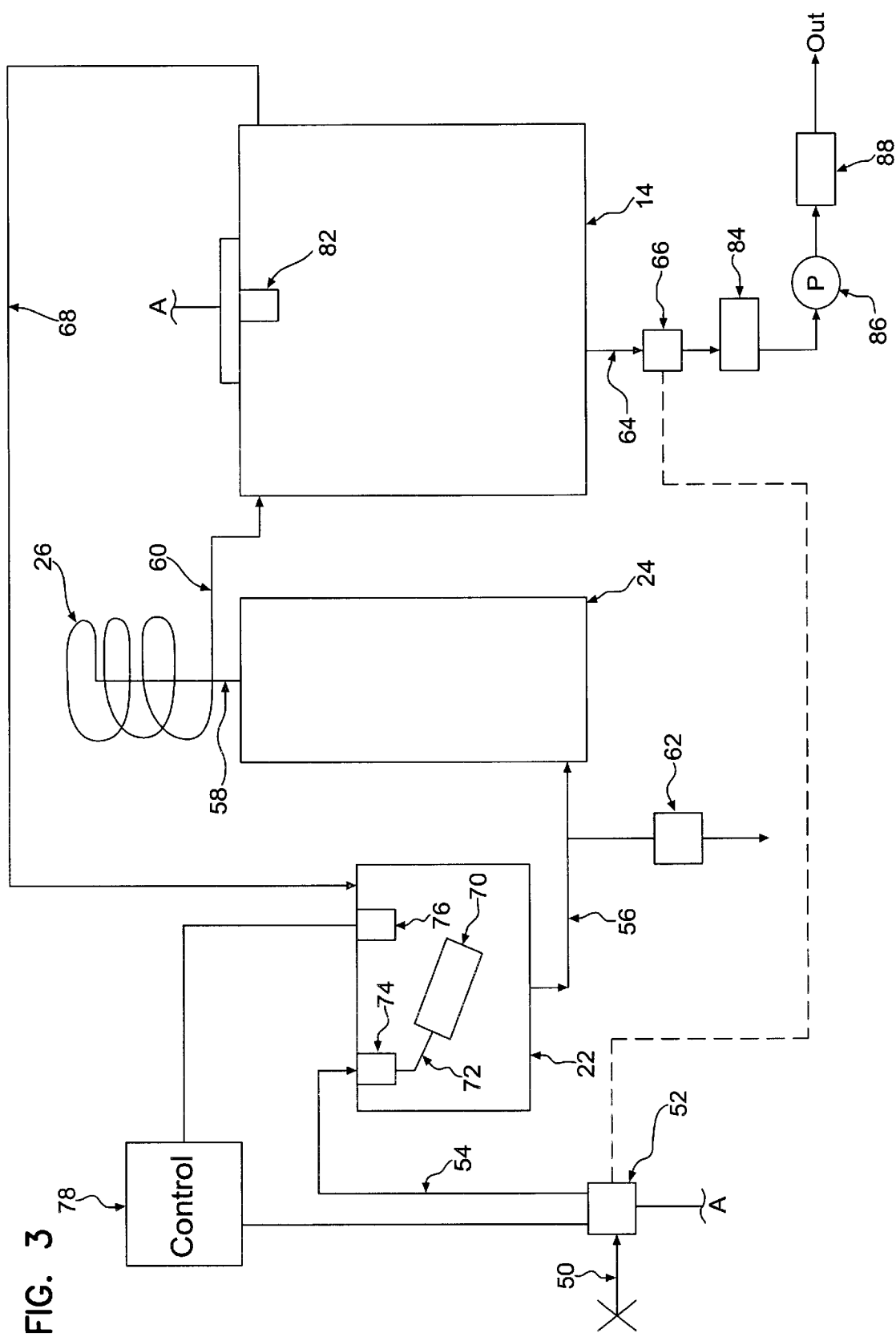
FIG. 3 is a diagrammatic view of the water purification system.

Attention is now directed to FIG. 3, along with FIG. 2, which illustrates in schematic fashion the connection between the elements within the system 10. An inlet water supply line 50 enters the housing 12, preferably through the rear thereof, and connects to an inlet water control valve 52, preferably a solenoid valve. A flow line 54 leads from the control valve 52 to the control tank 22. Likewise, a flow line 56 connects the control tank 22 to the boiling tank 24. A flow line 58 connects the boiling tank 24 to the condenser 26, and a flow line 60 connects the condenser 26 to the water tank 14. A drain valve 62, such as a manually operated spigot valve, connects to the flow line 56 to permit draining of the boiling tank 24. As is further evident from FIG. 3, an overflow line 68 connects to the top of the water tank 14 and discharges into the control tank 22. The flow into the system can be controlled by a mechanical float valve assembly 70, 72, 74 to be later described, or by the valve 52.

In addition, a distilled water outlet line 64 extends from the water tank 14, with flow through the line 64 monitored by a total dissolved solids (TDS) probe 66 connected to the valve 52 to control operation of the valve 52. The TDS probe 66 monitors the purity of the water by measuring the conductivity thereof which provides an indication of the amount of total dissolved solids in the water. In one implementation, the TDS probe 66 and its related software sample the water quality every 1 second. However, other sampling intervals, either longer or shorter than 1 second, could be used. If the purity of the water, as measured by the TDS probe 66 is not sufficient, the valve 52 is closed. On the other hand, if the purity of the water measured by the TDS probe 66 is acceptable, the valve 52 is open. The TDS probe 66 and the valve 52 are preferably connected to a controller 78 which controls operation thereof. The TDS probe 66 preferably measures the water purity on a predetermined periodic basis, controlled by the controller 78. Other means for measuring water purity, such as a pH sensor, could be used in place of or in addition to, the TDS probe 66.

In addition, with reference to FIGS. 2 and 3, the system 10 utilizes a filter 84, such as a carbon filter, that is placed in the outlet line 64, downstream from the TDS probe 66, and which is located outside of the housing 12. By placing the filter 84 on the outlet line 64, the need to run additional lines from the condenser to the filter and from the filter back to the distilled water tank, as is required in the systems disclosed in U.S. Pat. Nos. 5,281,309 and 5,464,531, is eliminated.

The system 10 can also optionally include a delivery pump 86 and a ultraviolet (UV) light sanitizer 88 in the outlet line 64, as illustrated in FIG. 3. The pump 86 is preferably mounted inside the housing 12, while the UV light sanitizer 88 is preferably mounted on a rear panel of the housing 12 on the exterior of the housing. However, the UV light sanitizer could be disposed in the interior of the housing 12 as well.

The pump 86, which is preferably controlled by the controller 78, facilitates delivery of water from the system 10, particularly in those instances when the location of the system 10 during use prevents adequate gravity feed of the water. However, the system 10 can also be utilized without the pump 86, instead relying on gravity to deliver water. The pump 86 is preferably a demand pump that turns on and operates to keep the outline line 64 pressurized when a dispensing valve (not illustrated) located at the end of the outlet line 64 is opened by a user to dispense water. In addition, the pump operation is preferably controlled by a float (not illustrated) in the water tank 14 that indicates water availability in the water tank 14. The float prevents operation of the pump 86 if insufficient water is present in the water tank 14.

The UV light sanitizer exposes the water prior to delivery to UV light for sanitizing the stored water in the tank 14 from microbe contaminants. Like the pump 86, the UV light sanitizer 88 is optional. In the preferred embodiment, the UV light stays on continuously to prevent bulb and starter wear and tear. However, it is contemplated that the UV light could be operated on a demand basis, rather than continuously. Moreover, other mechanisms capable of sanitizing water could be used in place of or in addition to the UV light sanitizer, including, but not limited to, ozonation, ultra-filtration, and chemical sanitizers.

The control tank 22 is designed to regulate the inflow of water to the boiling tank 24 and control the water level within the boiling tank. Included within the control tank 22 is a float 70 connected to an end of an arm 72, with the opposite end of the arm 72 connected to a valve member 74.

When the level of water in the control tank 22 reaches a predetermined level, the valve member 74 is actuated to shut the flow of water from the flow line 54 into the control tank 22. In addition, the control tank 22 includes a float switch 76 therein that is electrically connected, via the controller 78, to the control valve 52. The float switch 76 acts as a safety feature to prevent overfilling of the control tank 22 and the boiling tank 24 and water tank 14 downstream from the control tank 22, in the event of a failure in one of the float 70, arm 72 and valve member 74. If the valve member 74 fails to shut the flow of water, the water level in the control tank 22 will increase, eventually actuating the float switch 76. The float switch 76, when actuated, sends a signal through the controller 78 to the control valve 52 to close the control valve 52 and thereby prevent further inflow of water to the control tank 22.

The boiling tank 24 receives water from the control tank 22 and boils the water to remove contaminants therefrom as is well-known in the art. The boiling tank 24, as illustrated in FIG. 2, includes a heating element 80 therein for accomplishing the boiling of the water. As is understood in the art, steam that is generated by the boiling of water exits the top of the boiling tank 24 and enters the condenser 26, where the steam is condensed back into water, with the water flowing through the flow line 60 into the tank 14. Boiling of the water separates contaminants from the water, with steam having contaminants removed therefrom exiting the boiler to the condenser and the contaminants remaining behind in the boiling tank 24. Since contaminants remain in the boiling tank 24, it is necessary to periodically drain the boiling tank 24 thereby removing the contaminants and preventing buildup thereof. As shown in FIG. 3, draining of the boiling tank 24 is accomplished manually by opening the drain valve 62.

The water tank 14 is also provided with measures to prevent overfilling of the tank 14, thereby preventing water spillage from the system 10. As mentioned previously, the overflow line 68 leads from the top of the tank 14 back to the control tank 22. In the event that the water level in the tank 14 gets to high, excess water will flow from the tank 14 through the overflow line 68 back to the control tank 22. This excess water will contribute to filling of the control tank 22 and actuation of the float switch 76 to close the inlet valve 52. In addition, the tank 14 includes a float switch 82 associated with the lid 34 of the tank 14 that actuates when the water level in the tank 14 becomes too high. When the float switch 82 is actuated, a signal is sent, via the controller 78, to the inlet valve 52 to close the valve and prevent further water inflow into the system 10.

It is to be realized that the inlet valve 52, the float switches 76, 82 and the overflow line 68 each act to prevent water spillage from the system 10, by preventing overfilling of the control tank 22, the boiling tank 24 and the water tank 14. In addition, the construction of the system 10 is simplified compared with conventional systems, such as those found in U.S. Pat. Nos. 5,281,309 and 5,464,531 which utilize both a feedwater tank and a water level control tank/housing upstream of the boiler. The use of a feedwater tank takes up space, and provides additional apparatus that can fail and needs to be cleaned. In addition, a feedwater tank permits buildup of bacteria and/or algae and like contamination, particularly when water has been stagnant in the feedwater tank for a period of time.

The system 10 shown in FIGS. 1–3 eliminates the use of a feedwater tank and the detriments thereof. The inlet water supply line 50, which is preferably connected to a continuous water supply source such as a household or building water supply line, connects directly to the control tank 22 via the inlet valve 52. Thus, presuming that the water in the water supply line is fresh, the water entering the control tank 22 is fresh as well.

Figure 4:
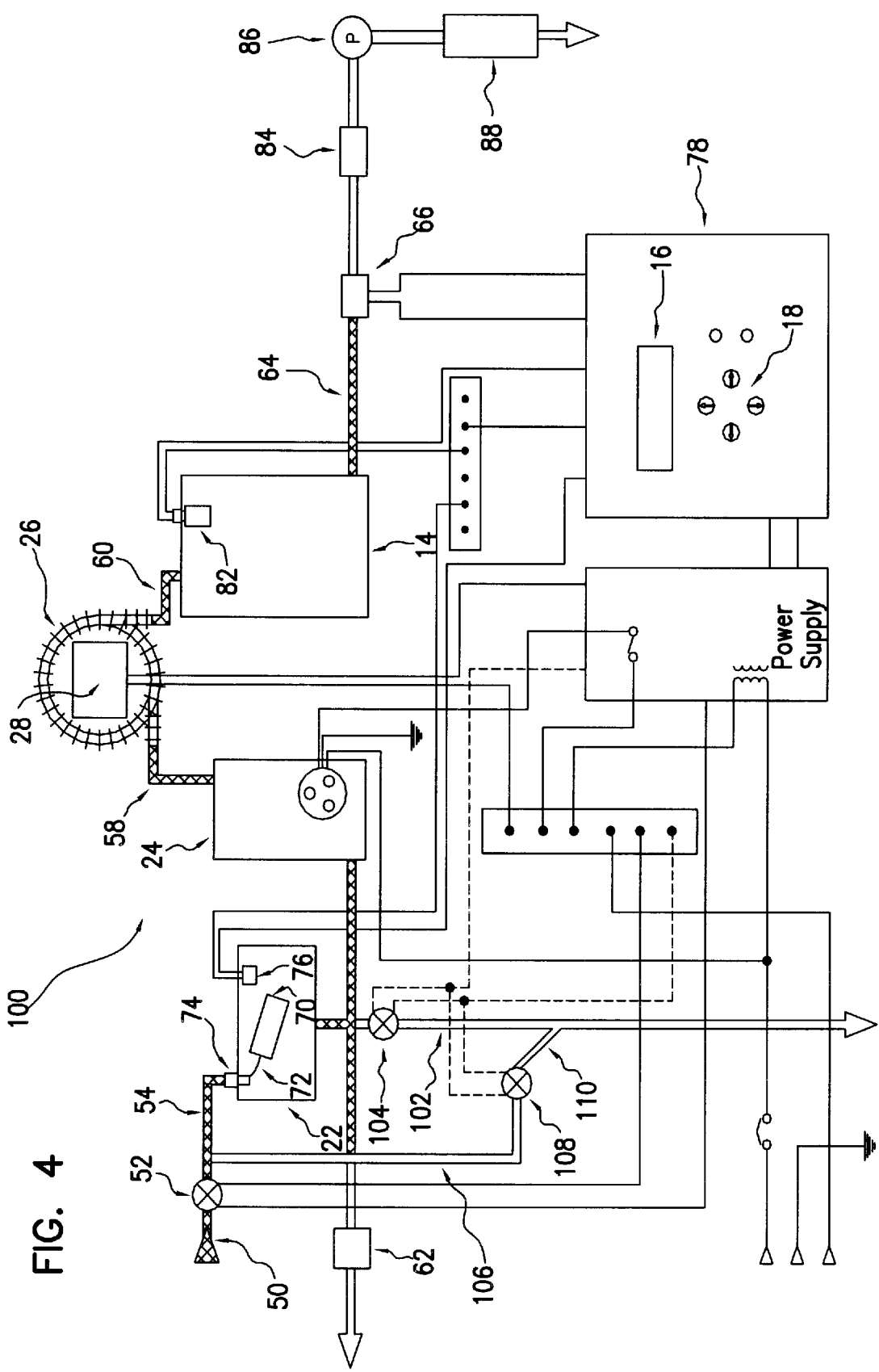
FIG. 4 is a schematic illustration of another version of the water purification system equipped for automatic draining of the boiling tank.

With reference now to FIG. 4, an alternative portable water purification system 100 is illustrated. Elements within the system 100 that correspond to elements within the system 10 are referenced by the same reference numerals. The system 100 is provided with the capability for automatic draining of the boiling tank 24 as well as cooling of the water that is to be drained. As shown in FIG. 4, a line 102 extends from the flow line 56. A drain valve 104, such as a solenoid valve, is disposed within the line 102 for controlling flow therethrough. In addition, a cooling water line 106 extends from the line 54 to the line 102, with flow through the line 106 controlled by a valve 108, such as a solenoid valve. It is to be noted that the drain spigot 62 is still present in this embodiment, in order to permit manual draining of the boiling tank 24.

Operation of the valves 104, 108, as well as the valve 52 and the TDS probe 66, and other electronic components, are controlled by the controller 78, with the float switches 76, 82 providing inputs to the controller 78. The controller 78 preferably includes a timer mechanism that can be set by a user, using the input buttons 18 to select the desired time interval(s) between draining operations, so that the valve 104 opens at periodic intervals in order to drain the boiling tank 24. Alternatively, as indicated above, the drain valve 62 can be opened manually when it is desired to drain the boiling tank 24.

Often times the water being drained from the boiling tank is extremely hot and needs to be cooled before the water can be discharged through line 102 to a drain. In order to accomplish cooling of the drain water, the valve 108 is opened by the controller 78, thereby allowing cool water from the inlet supply line 50 to mix with the hot water from the boiling tank 24 in the line 102 before the water exits the line 102 to the drain. Connecting the line 50 to the line 102 eliminates the need to add cooling water directly into the boiling tank 24. This is especially important when the boiling tank is at its maximum capacity of water, as dictated by the control tank which prevents further introduction of water when the boiling tank is full. If the boiling tank is full, no cooling water can be introduced because the control tank prevents further flow of water to the boiling tank. The embodiment described in FIG. 4 permits cooling of the water in a full boiling tank, since the cooling water is introduced in the line 102. The water in the boiling tank, which is typically at a high temperature, is cooled by the water from the inlet water supply which is typically at a lower temperature, to produce drain water at a temperature generally between the boiling tank water temperature and the inlet supply water temperature.

The cooling water line 106 is preferably connected to the line 102 by a two-way flow divider 110. The flow divider 110 is preferably a Y-shaped flow divider, although a three-way (or more) flow divider, with extra flow paths closed off to leave two flow-paths, could be used as well. The cooling water line 106 intersects the drain line 102 at an acute angle. As a result of this connection, the drain line 102 pulls a slight vacuum during draining due to the venturi effect. The slight vacuum pulls water from the boiling tank 24 and the control tank 22, and facilitates complete removal of contaminants from the boiling tank 24, as well as from the control tank 22.

The system 100 in FIG. 4 is shown without the overflow line 68 between the tank 14 and the control tank 22. However, it is to be realized that the system 100 could be utilized with the overflow line 68 shown in FIG. 3 if desired.

As an added safety feature, the system 10 can be provided with a moisture sensor 114 as illustrated in FIG. 2. The moisture sensor 114 is mounted on or within the housing portion 20a for detecting water spillage or leaks from the system 10. The sensor 114 is preferably connected to the valve 52, via the controller 78, for closing the valve 52 when water spillage is detected.

The above specification, examples and data provide a complete description of the manufacture and use of the composition of the invention. Since many embodiments of the invention can be made without departing from the spirit and scope of the invention, the invention resides in the claims hereinafter appended.

We claim:

1. In a portable water purification system having a control tank connected a water supply, the control tank including a float controlled valve that controls flow of water into tile control tank, the system further including a boiling tank, a condenser, and a distilled water tank, the improvement comprising:

an inlet solenoid control valve disposed between the water supply and said control tank, said inlet solenoid control valve controlling flow of water to said control tank; and a float switch in at least one of the control tank and the distilled water tank, said float switch is electrically connected to and controls operation of said inlet solenoid control valve; and a drain line connected to the boiling tank and further including a water cooling line extending between the water supply and the drain line.

2. The portable water purification system according to claim 1, wherein said means for draining comprises a manually operated drain valve.

3. The portable water purification system according to claim 1, wherein said means for draining comprises an electrically operated drain valve.

4. The portable water purification system according to claim 3, further including a cooling water line extending between said inlet line and said drain line, and a valve in said cooling water line controlling flow therethrough.

5. The portable water purification system according to claim 4, wherein said cooling water line is connected to the drain line by a two-way flow divider, whereby the drain line produces a vacuum.

6. The portable water purification system according to claim 3, further including a controller that controls operation of the system, said controller including a timer that can be set by a user to periodically open said electrically operated drain valve.

7. A portable water purification system for purifying water from a water supply, comprising:

a control tank, said control tank including a valve that controls flow of water into said control tank;

an inlet line, connected to the control tank for delivering water from the water supply to said control tank;

an inlet control valve on said inlet line controlling flow of water from the water supply to said control tank;

a boiling tank connected to said control tank for boiling water;

a condenser connected to said boiling tank for receiving steam from said boiling tank and for condensing the steam to form distilled water;

a distilled water tank connected to said condenser for collecting distilled water from said condenser; and a high water level sensor in at least one of said control tank and said distilled water tank, said sensor is electrically connected to and controls operation of said inlet control valve; and a sensor capable of detecting leaks from the system, said sensor being electrically connected to said inlet control valve.

8. A portable water purification system, comprising:

a control tank connected to a water supply;

a boiling tank connected to said control tank for boiling water;

a condenser connected to said boiling tank for receiving steam from said boiling tank and for condensing the steam to form distilled water;

a distilled water tank connected to said condenser for collecting distilled water from said condenser;

a drain line connected to said boiling tank;

an electronically operated drain valve controlling flow through said drain line; and a cooling water line extending between the water supply and said drain line to permit flow of cooling water from the water supply into said drain line.

9. The portable water purification system according to claim 8, further including a valve in said cooling water line controlling flow therethrough.

10. The portable water purification system according to claim 8, further including a controller that controls operation of the system, said controller including a timer that can be set by a user to periodically open said electronically operated drain valve.

11. A portable water purification system for purifying water from a water supply, comprising:

a control tank, said control tank including a valve that controls flow of water into said control tank;

an inlet line connected to the control tank for delivering water from the water supply to said control tank;

an inlet control valve on said inlet line controlling flow of water from the water supply to said control tank;

a boiling tank connected to said control tank for boiling water by a flow line;

a condenser connected to said boiling tank for receiving steam from said boiling tank and for condensing the steam to form distilled water;

a distilled water tank connected to said condenser for collecting distilled water from said condenser;

a high water level sensor in at least one of said control tank and said distilled water tank, said sensor is electrically connected to and controls operation of said inlet control valve, and further comprising a drain line connected to said flow line, and means for draining said boiling tank and said control tank through said drain line.

12. A water purification system, comprising:

a control tank connected to a water supply by an inlet line;

a boiling tank connected to said control tank by a flow line;

a condenser connected to said boiling tank for receiving steam from said boiling tank and for condensing the steam to form distilled water;

a distilled water tank connected to said condenser for collecting distilled water from said condenser;

a drain line connected to said flow line to permit draining of said control tank and said boiling tank, said drain line including a valve controlling flow therethrough; and a cooling water line extending between said inlet line and said drain line, and a valve in said cooling water line controlling flow therethrough.

13. The water purification system according to claim 12, wherein said cooling water line intersects said drain line at an acute angle thereby producing a vacuum that assists in draining said control tank and said boiling tank.

* * * * *

UNITED STATES PATENT AND TRADEMARK OFFICE
CERTIFICATE OF CORRECTION

PATENT NO. : 6,582,563 B1  Page 1 of 1
DATED : June 24, 2003
INVENTOR(S) : Adam et al.

It is certified that error appears in the above-identified patent and that said Letters Patent is hereby corrected as shown below:

<u>Column 7,</u>
Line 16, "tile" should read -- the --
Line 26, "boiling tank and" should read -- boiling tank, and --
Lines 29 and 32, "according to claim 1" should read -- according to claim 11 --

Signed and Sealed this

Twenty-seventh Day of April, 2004

JON W. DUDAS
*Acting Director of the United States Patent and Trademark Office*